(12) United States Patent
Aeberhard

(10) Patent No.: US 7,753,137 B2
(45) Date of Patent: Jul. 13, 2010

(54) HAND-HELD POWER TOOL

(75) Inventor: Bruno Aeberhard, Studen (CH)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 11/542,598

(22) Filed: Oct. 3, 2006

(65) Prior Publication Data
US 2007/0074885 A1 Apr. 5, 2007

(30) Foreign Application Priority Data
Oct. 5, 2005 (DE) .................. 10 2005 047 602

(51) Int. Cl.
*E21B 3/00* (2006.01)
(52) U.S. Cl. .................. 173/217; 173/162.1; 173/216
(58) Field of Classification Search ............. 173/216, 173/217, 162.1, 162.2; 192/223.1, 223.2, 192/38
See application file for complete search history.

(56) References Cited

U.S. PATENT DOCUMENTS

| 3,481,655 | A | * | 12/1969 | Campbell | 384/536 |
| 3,877,259 | A | * | 4/1975 | Bishop | 464/37 |
| 4,284,148 | A | * | 8/1981 | Wanner et al. | 173/109 |
| 4,291,790 | A | * | 9/1981 | Staub, Jr. | 192/3.28 |
| 4,380,442 | A | * | 4/1983 | Amsel | 464/93 |
| 5,947,254 | A | * | 9/1999 | Jones | 192/223.2 |
| 6,702,090 | B2 | * | 3/2004 | Nakamura et al. | 192/223.2 |

FOREIGN PATENT DOCUMENTS

| DE | 197 30 198 | 1/1999 |
| EP | 1 479 485 | 11/2004 |
| GB | 2 327 254 | 1/1999 |
| WO | 2005/093290 | 10/2005 |

* cited by examiner

*Primary Examiner*—Rinaldi I. Rada
*Assistant Examiner*—Nathaniel Chukwurah
(74) *Attorney, Agent, or Firm*—Michael J. Striker

(57) ABSTRACT

A hand-held power tool damping unit has a damping element which is configured for producing friction between an output unit and a drive unit for driving the output unit, wherein damping element includes at least one annular segment.

11 Claims, 5 Drawing Sheets

HAND-HELD POWER TOOL

CROSS-REFERENCE TO A RELATED APPLICATION

The invention described and claimed hereinbelow is also described in German Patent Application DE 102005047602.3 filed on Oct. 5, 2005. This German Patent Application, whose subject matter is incorporated here by reference, provides the basis for a claim of priority of invention under 35 U.S.C. 119(a)-(d).

BACKGROUND OF THE INVENTION

The present invention is directed in particular to a hand-held power tool damping unit with a damping element.

A hand-held power tool damping element is made known in DE 197 30 198 B4. It is integrated in a shaft coupling that includes a first coupling part, which is non-rotatably connected with a drive shaft, and a second coupling part, which is non-rotatably connected with an output shaft. The coupling parts can be rotated relative to each other, within the limits of circumferential backlash. The hand-held power tool damping unit includes a friction element, which serves to produce a moment of friction when the two coupling parts move relative to each other. The friction element is formed by a spring wire, which is inserted in the second coupling part and is pressed such that it bears against the first coupling part.

SUMMARY OF THE INVENTION

The present invention is directed, in particular, to a hand-held power tool damping unit with a damping element, which is provided for producing friction between an output unit and a drive unit for driving the output unit.

It is provided that the damping element includes at least one annular segment. In this context, "friction" is understood to mean, in particular, a force that counteracts a relative motion between the output unit and the drive unit, and which occurs at a contact point at which the drive unit and the output unit are in contact with each other. The damping element can be designed as part of the output unit and/or the drive unit, and preferably includes a rubbing surface, with which it bears against the drive unit or the output unit. In this context, an annular segment refers to a segment that extends, at least partially, along a circumferential region, and/or preferably has a curved region. By way of the annular segment, a large rubbing surface can be attained using a simple design, and a moment of friction with a distinct effect on the rubbing surface can be created.

An inventive hand-held power tool damping element is suited, in particular, for use in a self-blocking blocking device, which is provided for blocking a transfer of a torque from the output unit to the drive unit. To this end, this blocking unit provides circumferential backlash of the output unit relative to the drive unit, which is used, e.g., to wedge wedging elements. Due to this circumferential backlash, if damping means were not provided in the partial load region, a distinct, metallic noise would be produced, which is eliminated by the damping element.

It is also provided that the damping element includes at least one annular supporting element for supporting the annular segment. As a result, the damping element can be installed easily and automatically. In addition, free installation space between the central axis and the inner contour of the annular supporting element can be used advantageously for further parts, e.g., for an oscillating spindle in the case of an impact drill. The supporting element can be designed as a single component, or it can include several annular pieces, which are brought together during assembly.

If the damping element includes several annular segments, which are located in the circumferential direction of the annular supporting element, a large rubbing surface and a symmetrical generation of moments of friction can be advantageously attained.

In a further embodiment of the present invention, the damping element includes at least one fastening element, by way of which an advantageous stability of the damping element can be attained. The damping element can be fastened to the output unit or the drive unit.

In this context, it is provided that the hand-held power tool damping unit includes at least one receiving means, which is provided for producing a form-fit connection in interaction with the fastening element. As a result, particularly easy assembly can be attained.

When the hand-held power tool damping unit includes at least one securing element, which is provided for securing the fastening element in its fastening position, an undesired loosening of the damping element, e.g., when it is stressed during operation of a hand-held power tool, can be advantageously prevented.

In a further embodiment of the present invention, it is provided that the annular segment is designed as a spring element. In the installed state, the annular segment can bear, preloaded, against the drive unit or the output unit with a rubbing surface, by way of which a high moment of friction can be generated on the rubbing surface. The spring element is preferably composed of an elastic metal or plastic.

The present invention is furthermore directed to a hand-held power tool damping unit with a damping element, which is provided for producing friction between an output unit and a drive unit for driving the output unit.

It is provided that the damping element is provided for pulling the drive unit and the output unit toward each other. By way of the damping element, a contact force of the output unit and the drive unit on each other can be generated, by way of which large rubbing surfaces can be attained without any additional components, therefore resulting in low wear. Furthermore, large normal forces can be realized, without the need to provide additional support for the output unit and/or the drive unit. In addition, a force which tends to separate the output unit and the drive unit can be advantageously counteracted.

In this context, it is provided that the damping element includes at least one spring element, which is provided for pulling the drive unit and the output unit toward each other. As a result, a simple and low-cost configuration of the damping element can be attained. In addition, or as an alternative thereto, it is feasible that the output unit and the drive unit are pulled toward each other by a magnetic force.

It is furthermore provided that the damping element includes at least one annular segment, and the spring element is designed integral with the annular segment. By way of the annular segment, which advantageously bears, preloaded, against the drive unit or the output unit with a rubbing surface, a high moment of friction—in addition to the attraction force—can be generated on the rubbing surface using the spring element.

In an advantageous refinement of the present invention, the hand-held power tool damping unit includes a bevel, against which the annular segment is pressed and bears, in a loaded state. This bevel, which is preferably a surface of the output unit or the drive unit, advantageously forms an angle with a central axis of the output unit or the drive unit. The bevel can be designed, e.g., in the form of a conic surface. By way of the bevel, a return force of the annular segment perpendicular to the central axis can be advantageously redirected, so that this return force has a component that is directed parallel to the central axis.

Further advantages result from the description of the drawing, below. An exemplary embodiment of the present invention is shown in the drawing. The drawing, the description and the claims contain numerous features in combination. One skilled in the art will also advantageously consider the features individually and combine them to form further reasonable combinations.

The novel features of which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
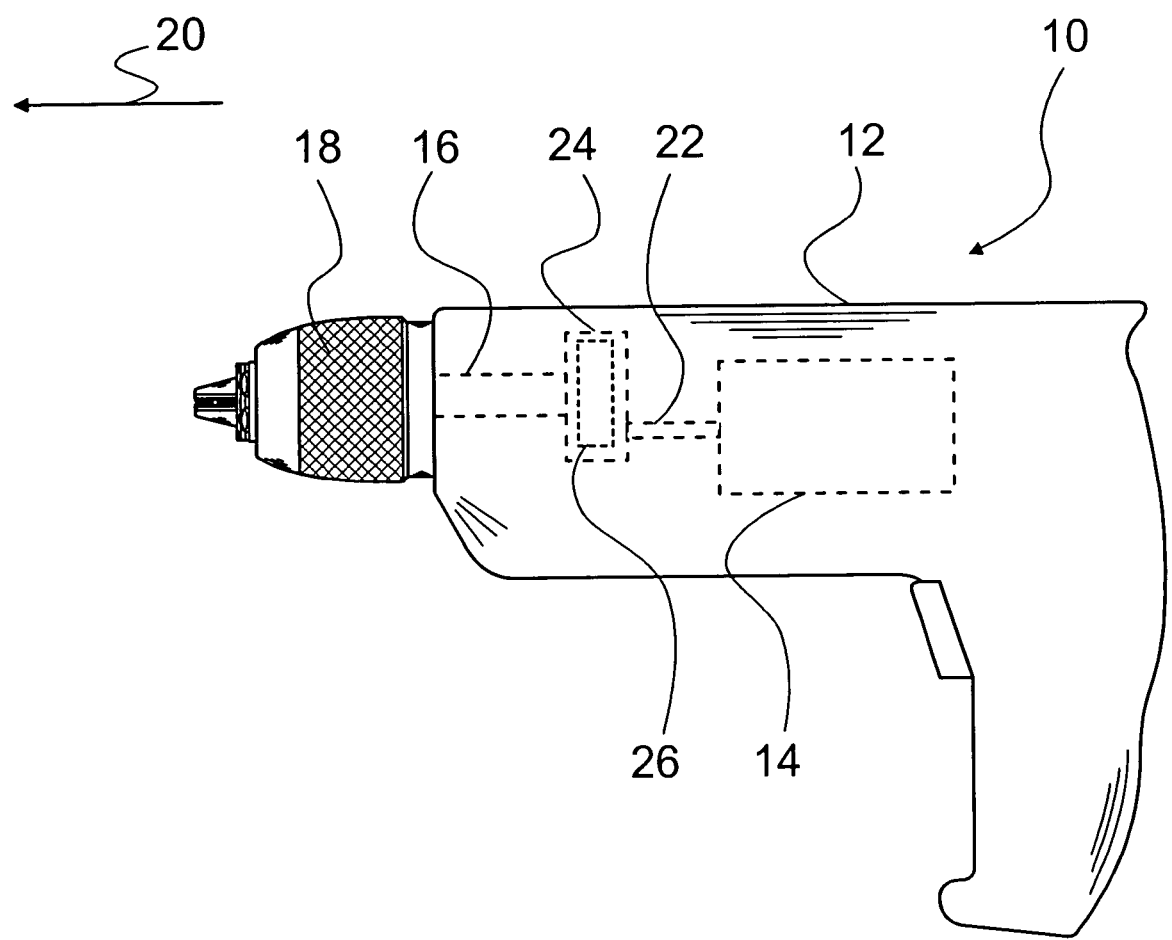
FIG. 1 shows a hand-held power tool with a motor unit, a drive spindle, and a transmission unit in accordance with the present invention.

FIG. 1 shows a hand-held power tool 10 designed as a cordless screwdriver. It includes a housing 12, a motor unit 14, a drive spindle 16, and a tool fitting 18, which is non-rotatably coupled with drive spindle 16. Drive spindle 16 is oriented in an axial direction 20. A motor shaft 22 is coupled with drive spindle 16 via a transmission unit 24 designed as a planetary gearset. Transmission unit 24 is also provided with a spindle locking device 26. This device, the design and mode of operation of which are described with reference to FIG. 2, allows drive spindle 16 to be driven freely by motor unit 14, but it prevents torque from being transmitted by drive spindle 16 via transmission unit 24 to motor shaft 22. As a result, a tool can be replaced, in particular, with a high amount of operating comfort.

Figure 2:
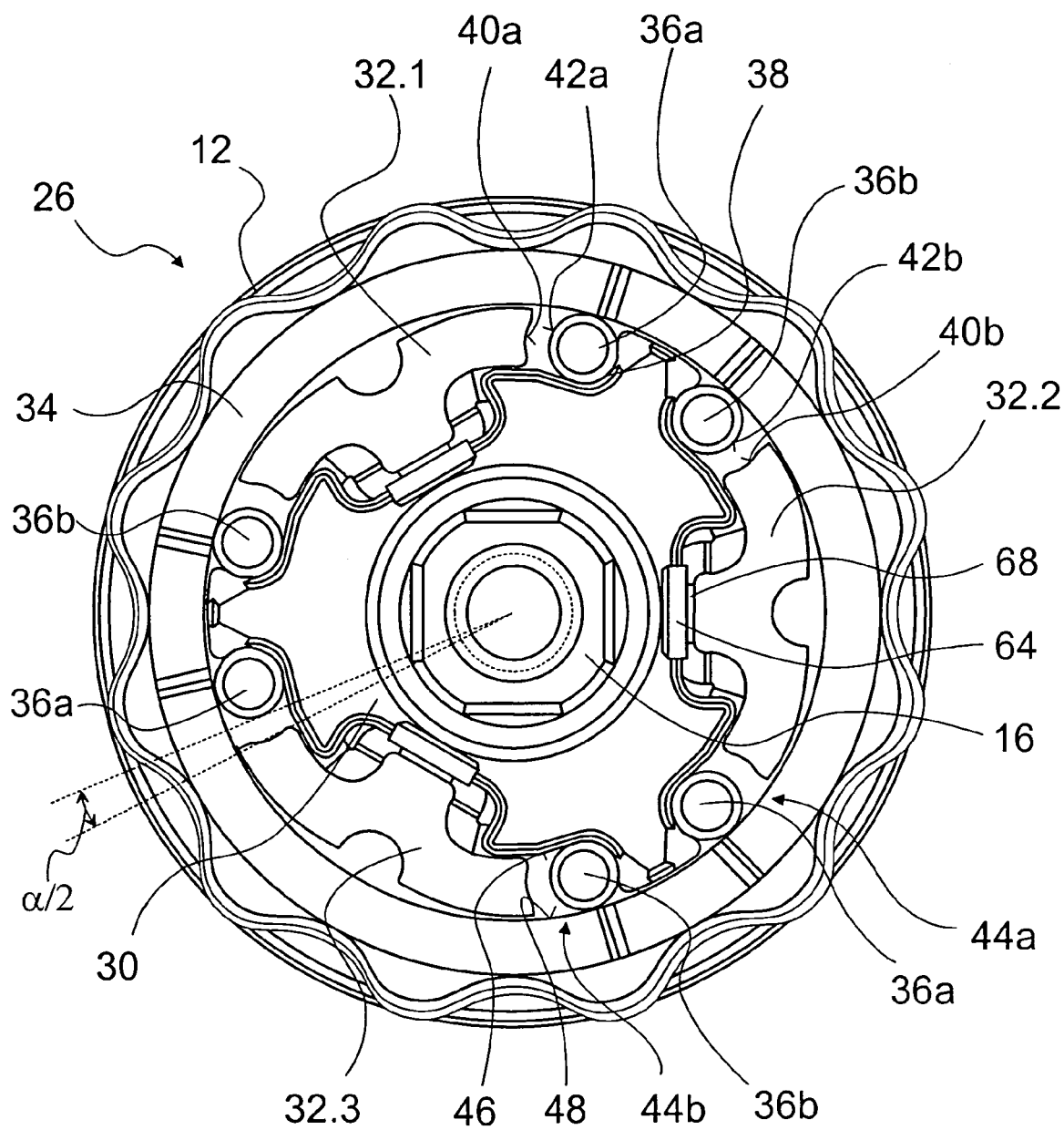
FIG. 2 shows a spindle locking device of the hand-held power tool, in accordance with the present invention.
Figure 3:
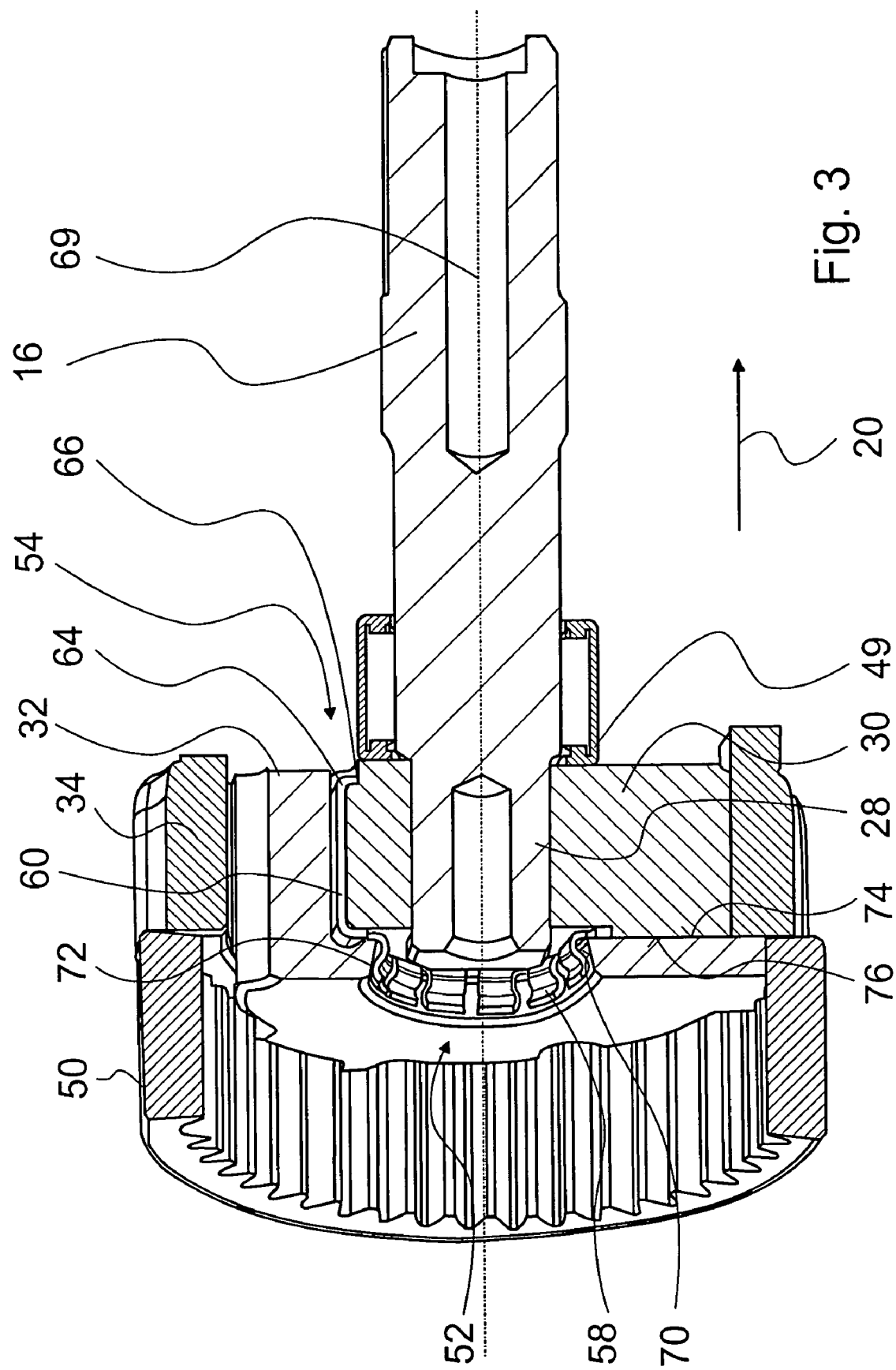
FIG. 3 shows the drive spindle, an element of the transmission unit with internal toothing, and an annular damping element with annular segments in accordance with the present invention.

The mode of operation of the spindle locking device 26 is shown in FIG. 2. Drive spindle 16 is shown in a top view in FIG. 2. A star 30, which is non-rotatably connected with drive spindle 16, is located on one end 28 of drive spindle 16 (FIG. 3). During operation of hand-held power tool 10, star 30 is driven to rotate by motor unit 14 via a drive unit 32 designed as a driving element. Three parts, 32.1, 32.2, and 32.3, of drive unit 32 are shown in the figure. Drive unit 32 and star 30 are enclosed by an outer ring 34, which is attached to housing 12. Spindle locking device 26 includes wedging elements, which are designed as wedging rollers 36a, 36b, and are accommodated in receiving areas 38 of star 30.

In addition, circumferential backlash is provided between star 30 and drive unit 32. Star 30 is movable relative to drive unit 32 within the range of this circumferential backlash. The circumferential backlash is labeled as a half angle of rotation α/2 in the figure.

It is assumed that drive unit 32 is driven by motor unit 14 to rotate in the clockwise direction. Based on the configuration shown in FIG. 2, drive unit 32 rotates relative to star 30, until surfaces 40a of drive unit 32 each contact an outer surface 42a of one of the wedging rollers 36a. After contact is made, rotation of star 30 and drive spindle 16 in the clockwise direction is driven by drive unit 32. When drive unit 32 rotates in the counterclockwise direction, each of the surfaces 40b of drive unit 32 contacts an outer surface 42b of one of the wedging rollers 36b and drives star 30 to rotate in the counterclockwise direction.

It is now assumed that drive spindle 16 is driven to rotate in the counterclockwise direction by an operator who wants to replace the tool. Star 30 rotates within the range of the circumferential backlash relative to drive unit 32 and outer ring 34. When this motion occurs, wedging rollers 36b become wedged in constrictions 44b formed by an outer surface 46 of star 30 and an inner contour 48 of outer ring 34. This wedging prevents star 30 from rotating further. When star 30 rotates in the clockwise direction, wedging rollers 36a become wedged in constrictions 44a.

FIG. 3 shows drive spindle 16, which is guided through a spindle bearing 49; star 30, which is non-rotatably connected with drive spindle 16; drive unit 32, which is designed as a driving element, and outer ring 34. End 28 of drive spindle 16 is designed in the shape of a square. Other form-fit elements can be used, however, which satisfy the geometric and mechanical requirements. An internal gear 50 with inner toothing of transmission unit 24 is non-rotatably coupled with drive unit 32.

To prevent an undesired noise from occurring during operation of hand-held power tool 10—which is due to the circumferential backlash of spindle locking device 26—hand-held power tool 10 is provided with a hand-held power tool damping unit. It includes a damping element 52, which is provided to produce friction with drive unit 32. Damping element 52 is non-rotatably connected with star 30 and forms therewith an output unit 54, which is non-rotatably connected with drive spindle 16. Damping element 52 includes an annular supporting element 56 (see FIG. 4), on which several annular segments 58 are integrally formed. Each of these is designed in the shape of a clamp, and they are located in the circumferential direction of annular supporting element 56. To fasten damping element 52 to star 30, damping element 52 is provided with fastening elements 60 designed as arms (see also FIG. 4). The hand-held power tool damping unit is provided with receiving means 62, which are formed by recesses in star 30, and in which the arms are accommodated (see FIG. 5). Each of these fastening elements 60 includes an end designed in the shape of an arm wraparound 64, which, in the installed state, is snapped into a wraparound 66 of one of the receiving elements 62. To prevent arm wraparounds 64 from sliding out of wraparounds 66 of receiving means 62 when loads are placed on hand-held power tool 10, the hand-held power tool damping unit is provided with securing elements 68, which are formed by ribs of drive unit 32, which are shown in FIG. 2. Arm wraparounds 64 of fastening elements 60 of damping element 52 are also shown in FIG. 2. Damping element 52 is therefore positioned, fastened, and secured on star 30 concentrically and axially around a central axis 69.

An attraction force is produced between output unit 54 and drive unit 32. To this end, annular segments 58 of damping element 52 are designed as spring elements, in the form of springs subjected to bending, and the hand-held power unit damping unit has a bevel 70, against which annular segments 58 are pressed and bear, in a preloaded state. This bevel 70 is formed by an inner surface of drive unit 32, which forms an angle with central axis 69. Via the bearing of annular segments 58 in the preloaded state, a return force is produced at contact points 72, where annular segments 58 touch bevel 70. The return force has a component in axial direction 20. Via this component, an attraction force is produced between drive unit 32 and output unit 54.

Furthermore, when damping element 52 moves relative to bevel 70, a moment of friction is produced at contact points 72, which counteracts this relative motion. When, during operation of hand-held power tool 10, rotation of drive unit 32 by motor unit 14 is braked in a stepwise manner or abruptly, torques of drive unit 32 and output unit 54 differ momentarily, so that a relative motion of drive unit 32 and output unit 54 occurs within the range of the circumferential backlash, and spindle locking device 26 is activated. A moment of friction is produced at contact points 72, and the relative motion is braked. A noise that is produced when wedging rollers 36a, 36b become wedged, or when drive unit 32 contacts wedging rollers 36a, 36b is therefore prevented.

Figure 4:
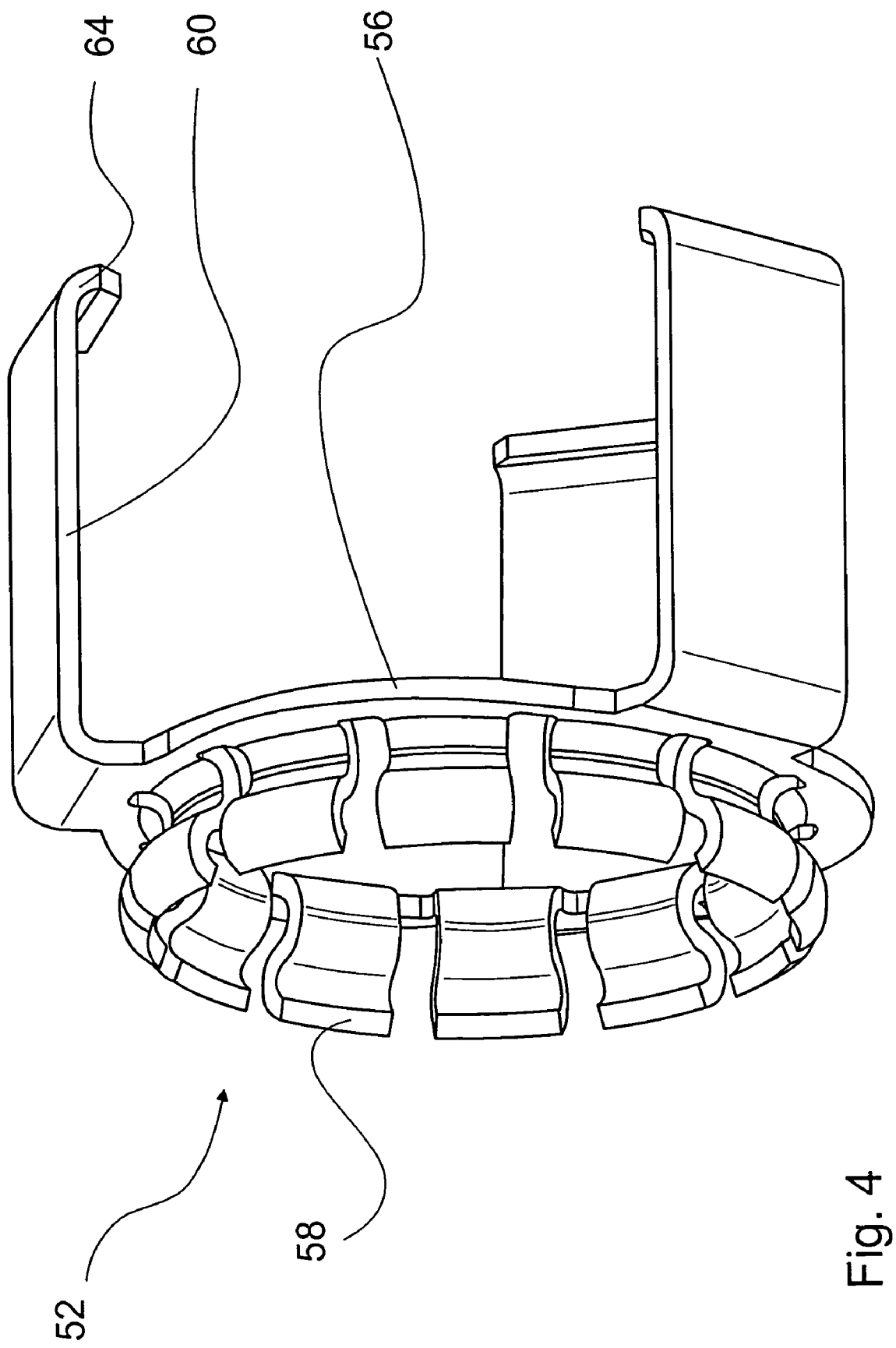
FIG. 4 shows the damping element in accordance with the present invention.

Damping element 52 is shown separately in a perspective view in FIG. 4.

Figure 5:
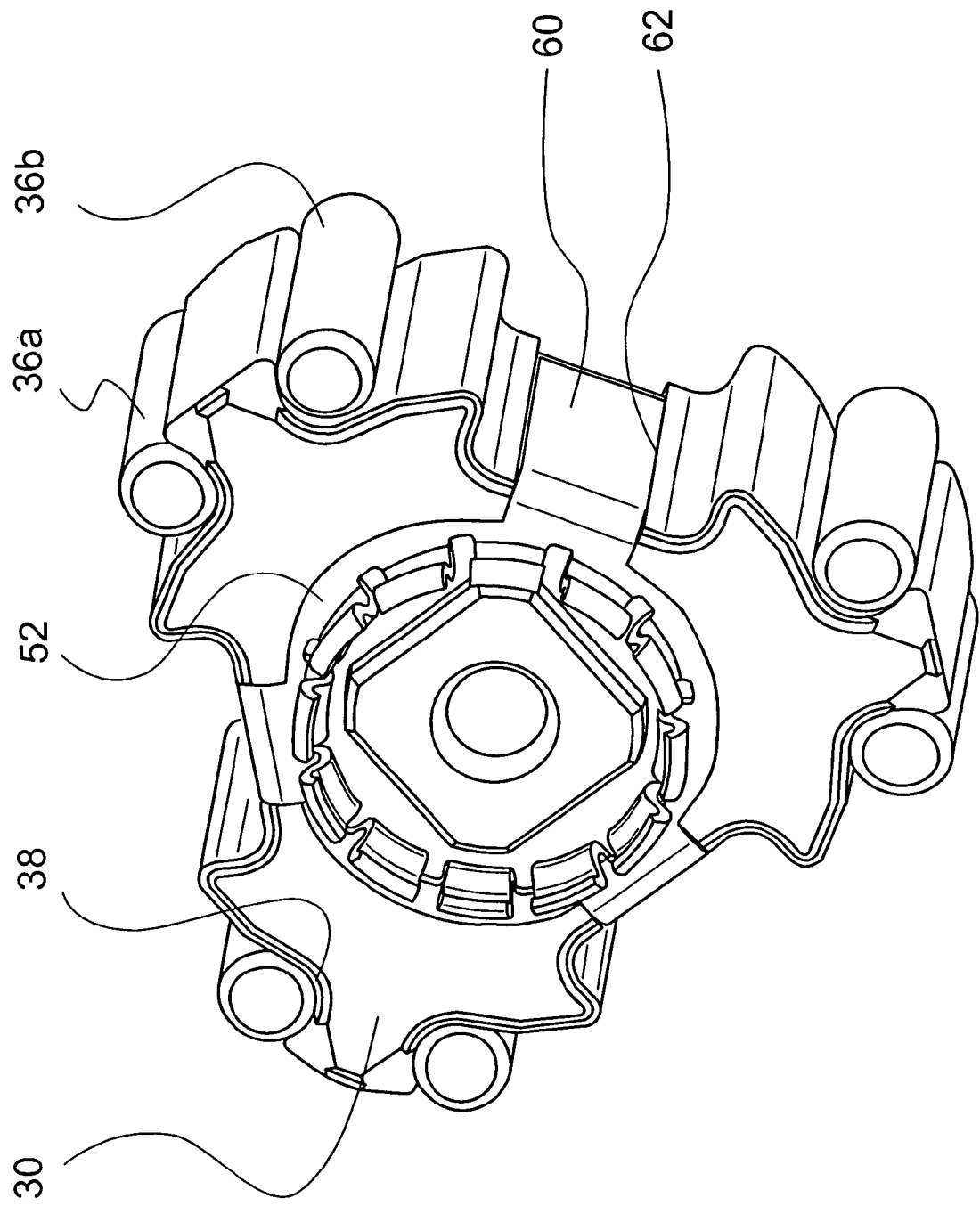
FIG. 5 shows the damping element, a star, and wedging rollers of the spindle locking device placed on the star in accordance with the present invention.

FIG. 5 shows damping element 52, which is fastened to star 30. Fastening elements 60 are each located in a receiving means 62 of star 30. Receiving elements 62 also serve to support the torque of damping element 52. Wedging rollers 36a, 36b of spindle locking device 26 in receiving areas 38 are located on star 30.

Assembly is described with reference to FIGS. 3 and 5. In a first assembly step, star 30 is placed on end 28 of drive spindle 16. Next, damping element 52 is fastened to star 30 by sliding fastening elements 60 into receiving elements 62 until the arm wraparounds 64 snap into wraparounds 66. Wedging rollers 36a, 36b are then each slid into one of the receiving areas 38. Drive unit 32 is then slid in axial direction 20, until surface 74 of drive unit 32 contacts a surface 76 of star 30. When this sliding motion occurs, annular segments 58 reach bevel 70 of drive unit 32. Annular segments 58, which are designed as spring elements in the form of springs subjected to bending, are bent continually. After drive unit 32 contacts star 30, annular segments 58 bear, preloaded, against bevel 70. They exert a return force at contact points 72, which has a component in axial direction 20 and, by way of which, an attraction force is produced between drive unit 32 and output unit 54.

It will be understood that each of the elements described above, or two or more together, may also find a useful application in other types of constructions differing from the type described above.

While the invention has been illustrated and described as embodied in a hand-held power tool, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A hand-held power tool, comprising:
an output unit;
a drive unit for driving said output unit, said drive unit having a rotation axis; and a damping unit with a damping element which is configured for producing friction between said output unit and said drive unit, wherein said output unit comprises a self-blocking device and said damping element is non-rotatably connected either with said output unit or with said drive unit, said damping element including at least one annular segment formed as a spring element and configured to pull the drive unit and the output unit toward each other in an axial direction that is parallel to said rotation axis,
wherein said damping element includes several said annular segments which are located in a circumferential direction of said annular supporting element.

2. A hand-held power tool, comprising:
an output unit;
a drive unit for driving said output unit, said drive unit having a rotation axis; and a damping unit with a damping element which is configured for producing friction between said output unit and said drive unit, wherein said output unit comprises a self-blocking device and said damping element is non-rotatably connected either with said output unit or with said drive unit, said damping element including at least one annular segment formed as a spring element and configured to pull the drive unit and the output unit toward each other in an axial direction that is parallel to said rotation axis,
wherein said spring element is designed integral with said annular segment.

3. A hand-held power tool, comprising:
an output unit;
a drive unit for driving said output unit, said drive unit having a rotation axis; and a damping unit with a damping element which is configured for producing friction between said output unit and said drive unit, wherein said output unit comprises a self-blocking device and said damping element is non-rotatably connected either with said output unit or with said drive unit, said damping element including at least one annular segment formed as a spring element and configured to pull the drive unit and the output unit toward each other in an axial direction that is parallel to said rotation axis,
wherein said damping element includes at least one fastening element.

4. A hand-held power tool as defined in claim 3; and further comprising at least one receiving means configured for producing a form-fit connection in interaction with said fastening element.

5. A hand-held power tool as defined in claim 4, wherein said self-blocking device includes a star and at least one receiving means are located on said star.

6. A hand-held power tool as defined in claim 4, wherein said at least one receiving means are formed by recesses.

7. A hand-held power tool as defined in claim 3; and further comprising at least one securing element which is configured for securing said fastening element in its fastening position.

8. A hand-held power tool as defined in claim 3, wherein said fastening element is designed as an arm which is located in the circumferential direction on said annular supporting element on the opposite side of the annular segment and extends in the axial direction.

9. A hand-held power tool as defined in claim 3, wherein said fastening element includes a connecting end which is connected to said annular supporting element and said fastening element includes an end which is disposed on an opposite side of said connecting end along the axial direction of said fastening element, wherein said end is designed in the shape of an arm wrap-around to secure said damping element in the axial direction.

10. A hand-held power tool as defined in claim 3, wherein said at least one fastening element is configured to be fastened to said self-blocking device.

11. A hand-held power tool as defined in claim 3, wherein said at least one fastening element is configured as an arm.

* * * * *